United States Patent
Rexhepi et al.

(10) Patent No.: US 7,904,088 B2
(45) Date of Patent: Mar. 8, 2011

(54) IDENTIFYING NETWORK RESOURCES FOR PACKET-SWITCHED SERVICES

(76) Inventors: Vlora Rexhepi, Espoo (FI); Guillaume Sebire, Espoo (FI); Shkumbin Hamiti, Espoo (FI)

( * ) Notice: Subject to any disclaimer, the term of this patent is extended or adjusted under 35 U.S.C. 154(b) by 1003 days.

(21) Appl. No.: 10/569,458

(22) PCT Filed: Aug. 25, 2004

(86) PCT No.: PCT/FI2004/000498
§ 371 (c)(1),
(2), (4) Date: Apr. 28, 2006

(87) PCT Pub. No.: WO2005/020617
PCT Pub. Date: Mar. 3, 2005

(65) Prior Publication Data
US 2006/0256749 A1    Nov. 16, 2006

(30) Foreign Application Priority Data
Aug. 26, 2003 (FI) .................................. 20031202

(51) Int. Cl.
*H04W 36/00* (2009.01)
(52) U.S. Cl. ......... 455/439; 455/436; 455/437; 455/438; 455/453; 455/440; 455/441; 455/442; 455/443; 455/444; 455/450; 455/451; 370/352
(58) Field of Classification Search .......... 455/436–444, 455/450–453; 370/352
See application file for complete search history.

(56) References Cited

U.S. PATENT DOCUMENTS
2002/0049059 A1* 4/2002 Soininen et al. .............. 455/439

FOREIGN PATENT DOCUMENTS
| AL | 03/001830 A1 | 1/2003 |
| EP | 1 392 017 A1 | 2/2004 |
| EP | 1 392 071 A1 | 2/2004 |
| FI | 106288 B | 7/2000 |
| WO | 02/13559 A1 | 2/2002 |
| WO | 02/19739 A2 | 3/2002 |

OTHER PUBLICATIONS

3GPP TS 23.003 V3.10.0 (Jun. 2002)Technical Specification 3rd Generation Partnership Project; Technical Specification Group Core Network; Numbering, addressing and identification (Release 1999).*
International Search Report for PCT/FI 2004/000498, dated Dec. 15, 2004.
The Written Opinion for PCT/FI2004/000498 mailed on Dec. 15, 2004.
Examination report for European Patent Application 04 767 012.0, dated Jan. 15, 2010.

* cited by examiner

*Primary Examiner* — Rafael Pérez-Gutiérrez
*Assistant Examiner* — Munjalkumar Patel (57) ABSTRACT

The present invention relates to identifying resources allocated in a cellular network for a mobile station for packet-switched services. A first identifier is used for identifying a mobile station, and a second identifier is used for identifying resources allocated for packet-switched services for the mobile station. When a mobile station is entering or has entered a second cell from a first cell, a value of a first type for the second identifier is determined. The first type of the second identifier is for use in both the first cell and the second cell for transmitting packet-switched data between the cellular network and the mobile station.

33 Claims, 8 Drawing Sheets

Table 1: TLLI structure (3GPP 23.003)

| 31 | 30 | 29 | 28 | 27 | 26 to 0 | Type of TLLI |
|---|---|---|---|---|---|---|
| 1 | 1 | T | T | T | T | Local TLLI |
| 1 | 0 | T | T | T | T | Foreign TLLI |
| 0 | 1 | 1 | 1 | 1 | R | Random TLLI |
| 0 | 1 | 1 | 1 | 0 | A | Auxiliary TLLI |
| 0 | 1 | 1 | 0 | X | X | Reserved |
| 0 | 1 | 0 | X | X | X | Reserved |
| 0 | 0 | 0 | 0 | G | G | Part of the assigned G-RNTI |
| 0 | 0 | 0 | 1 | R | R | Random G-RNTI |
| 0 | 0 | 1 | H | H | H | Handover TLLI |

Fig. 8

IDENTIFYING NETWORK RESOURCES FOR PACKET-SWITCHED SERVICES

BACKGROUND OF THE INVENTION

1. Field of the Invention

The invention relates in general to identifying network resources allocated for packet switched services in cellular networks. In particular, the invention relates to identifying network resources allocated for packet-switched services when mobile station is entering a new cell.

2. Description of the Related Art

A communication system can be seen as a facility that enables communication sessions between two or more entities such as user equipment and/or other nodes associated with the communication system. The communication may comprise, for example, communication of voice, data, multimedia and so on. Communication systems providing wireless communication for user equipment are known. Cellular communication systems are configured to have a cell structure, and typically they support communication with user equipment changing locations (mobile users). The support for communications for mobile users may include support for handing existing connections from one cell to another cell. At least routing of calls or communications for a mobile user in a new cell is typically supported in cellular systems. Some examples of a cellular system are the Global System for Mobile Telecommunications (GSM) and General Packet Radio Service (GPRS). GPRS provides packet-switched data services and utilizes the infrastructure of a GSM system. Two further examples of cellular systems are EDGE and EGPRS, which are further enhancements to GSM and GPRS. EDGE refers to Enhanced Data Rates for GSM Evolution, and EGPRS refers to EDGE GPRS.

For illustrating packet-switched services in cellular system, GPRS and EGPRS systems are used below as examples. It is, however, appreciated, that similar concepts may be found also in other cellular systems supporting packet-switched services.

In the following description, reference is made to Third Generation Partnership Project (3GPP) technical specifications TS 08.18, TS 23.003, TS 23.107, TS 23.060, TS 24.008, TS 29.060, TS 44.060, and TS 44.065. These technical specifications are known to a person skilled in the art of cellular networks.

Figure 1:
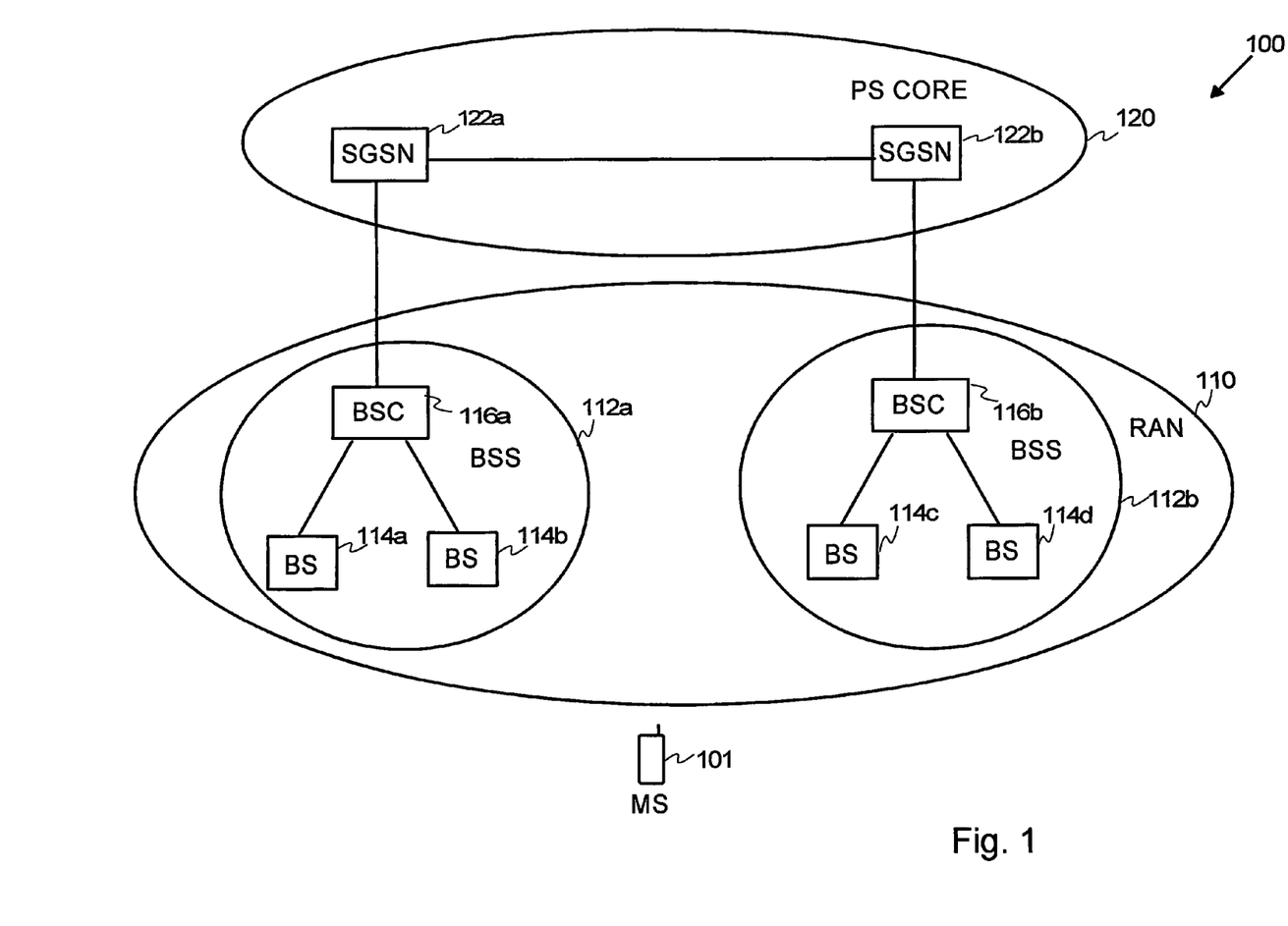
FIG. 1 shows schematically a cellular communication system with which embodiments of the invention can be used.

FIG. 1 illustrates schematically, as an example of a cellular network supporting packet-switched services, a GSM/GPRS network 100. Alternatively, the system 100 may be an EDGE/EGPRS network. Only some of the network elements of a GSM/GPRS network are illustrated in FIG. 1. The radio access network 110 comprises a number of base station systems (BSS) 112a, 112b. Each base station system 112 comprises a base station controller (BSC) 114 and a number of base stations (BS) 116. A mobile station (MS) 101 communicates with a base station 116 over a radio interface. The packet-switched core network 120 of the system 100 comprises a number of GPRS Supporting Nodes (GSN) 122. Each mobile station registered for packet-switched services has a serving GSN, called SGSN, which is responsible for controlling the packet-switched connections to and from the mobile station. The packet-switched core network 120 is typically connected to further packet-switched networks via a Gateway GSN (GGSN).

Figure 2:
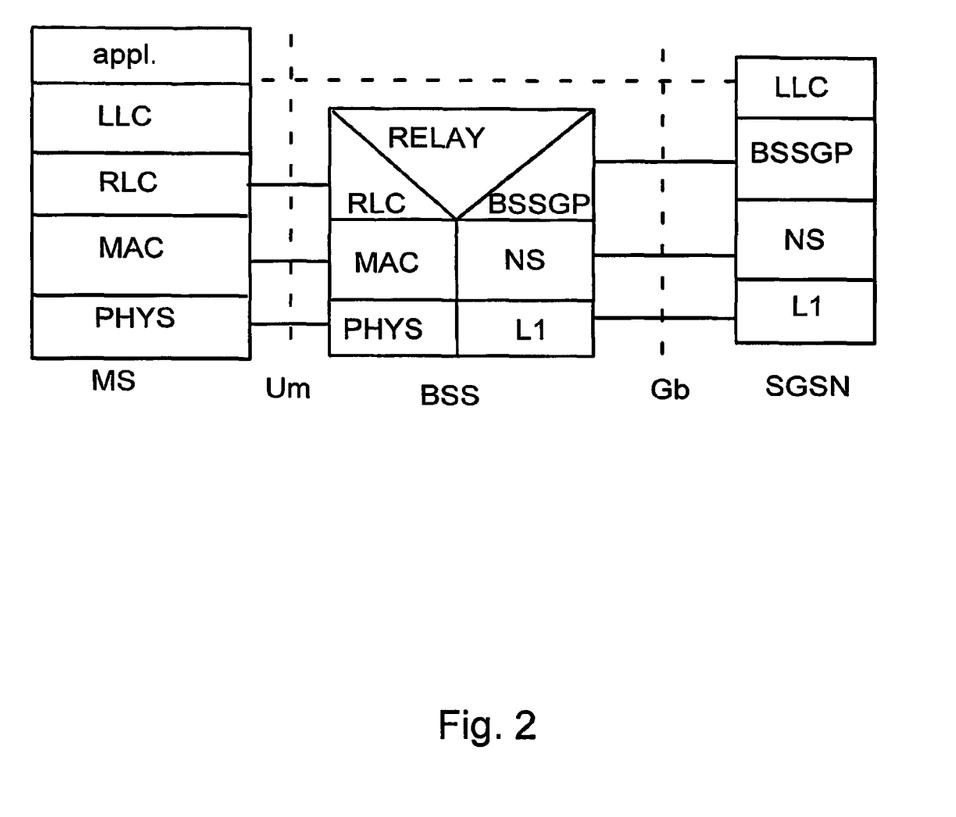
FIG. 2 shows schematically protocol stacks of some network elements shown in FIG. 1.

FIG. 2 shows schematically the protocol stacks of some of the network elements illustrated in FIG. 1 and identifies some interfaces. The interface between an SGSN and a BSS is called Gb. In the SGSN protocol stack and in the BSS protocol stack towards the SGSN the following protocols are common. The lowest protocol is called Layer 1. The second protocol is Network Service (NS), and the third protocol is Base Station System GPRS Protocol (BSSGP). The fourth protocol in the SGSN protocol stack in Link Layer Control (LLC), and the counterpart for this protocol entity is found in the MS protocol stack.

The interface between a MS and a BSS is called Um. The protocols are common in the MS protocol stack and in the BSS protocol stack towards the MS are the following: the lowest protocol is called the physical layer (PHY), the second in the Media Access Control (MAC) protocol and the third in the Radio Link Control (RLC) protocol. In the MS protocol stack, there is further the LLC protocol and on top of that further protocols or applications. In the BSS protocol stack, data is relayed between the RLC protocol and the BSSGP protocol.

A GPRS or EGPRS network assigns a temporary identifier for a mobile station wishing to have access to packet-switched service. This identifier is a Packet-Temporary Mobile Subscriber Identifier (P-TMSI), and it is assigned by the SGSN. P-TMSI handling is discussed in TS 23.003 and TS 24.008. A further identifier, a Temporary Logical Link Identifier (TLLI), is used for addressing resources allocated for GPRS services at RLCIMAC layer on the Um interface and in the BSSGP layer on the Gb interface. The value for TLLI is built by the MS or by SGSN either on the basis of the Packet-Temporary Mobile Subscriber Identity (P-TMSI) or directly (random TLLI). TLLI handling is discussed in TS 23.003.

A packet data protocol (PDP) context refers to information sets held in MS and GPRS Supporting Nodes (GSNS) that are used to bind the MS to an PDP address that identifies an application, PDP type and a QoS profile. PDP context functions are discussed in 3GPP TS29.060.

For identifying MS PDP contexts, the TLLI identifier is used together with a Network layer Service Access Point Identifier (N-SAPI). N-SAPI is an identifier used at a Subnetwork Dependent Convergence Protocol (SNDCP) layer in a mobile station and in a SGSN.

A further identifier for identifying packet-switched services in the Packet Flow Identifier (PFI). The PFI identifier is assigned by the SGSN, and the PFI identifies the packet flow for a certain MS.

In the following, resources allocated for packet-data services in a GSM/EDGE Radio Access Network (GERAN) are discussed. Depending on which interface is used to connect the radio access network to the core network, there are two types of GERAN architectures: GERAN A/Gb mode and GERAN Iu mode. The following description relates in particular to GERAN A/Gb mode, thus it may not be applicable to GERAN Iu mode. There are two main identifiers for packet switched service classes and mobile stations in GERAN A/Gb mode: the Packet Flow Identifier (PFI) and the Temporary Logical Link Identity (TLLI).

A cell refers to a basic unit of the cellular network. Each base station may form a cell, or base station may be provided with transceivers, whereof each forms a cell. In a GPRS/EGPRS network, a mobile station 101 is communicating with one base station (cell) at a time. When the mobile station 101 moves, it changes cell. In a GSM network, term handover refers to handing over (circuit-switched) connections from the old (source) cell to a new (target) cell.

There is need also for a handover for the packet-switched connections. A packet-switched handover would minimize the service interruption times by allowing continuous data transfer between a MS and a cellular system, when the MS is moving from one cell to another cell. A packet-switched handover may be an intra-SGSN handover or an inter-SGSN handover. In an intra-SGSN handover, the source and target BSS are controlled by the same SGSN. In an inter-SGSN handover, the source BSS is controlled by a first (source) SGSN and the target BSS is controlled by a second (target) SGSN.

There exists a proposal in the 3GPP TSG GERAN, namely "Support of Conversational Services over the PS domain; Technical Report (Release 6)" version 0.7.0, for a packet-switched handover procedure in a GPRS/EGPRS network. This proposal provides the technical solutions to support conversational QoS class in the GERAN A/Gb mode. Conversational QoS class is used to carry real-time traffic flows most sensitive to delay. Conversational QoS class is discussed in TS 23.107. In this proposal, a packet-switched handover for conversational QoS class comprises two phases: a preparation phase and an execution phase.

Figure 3:
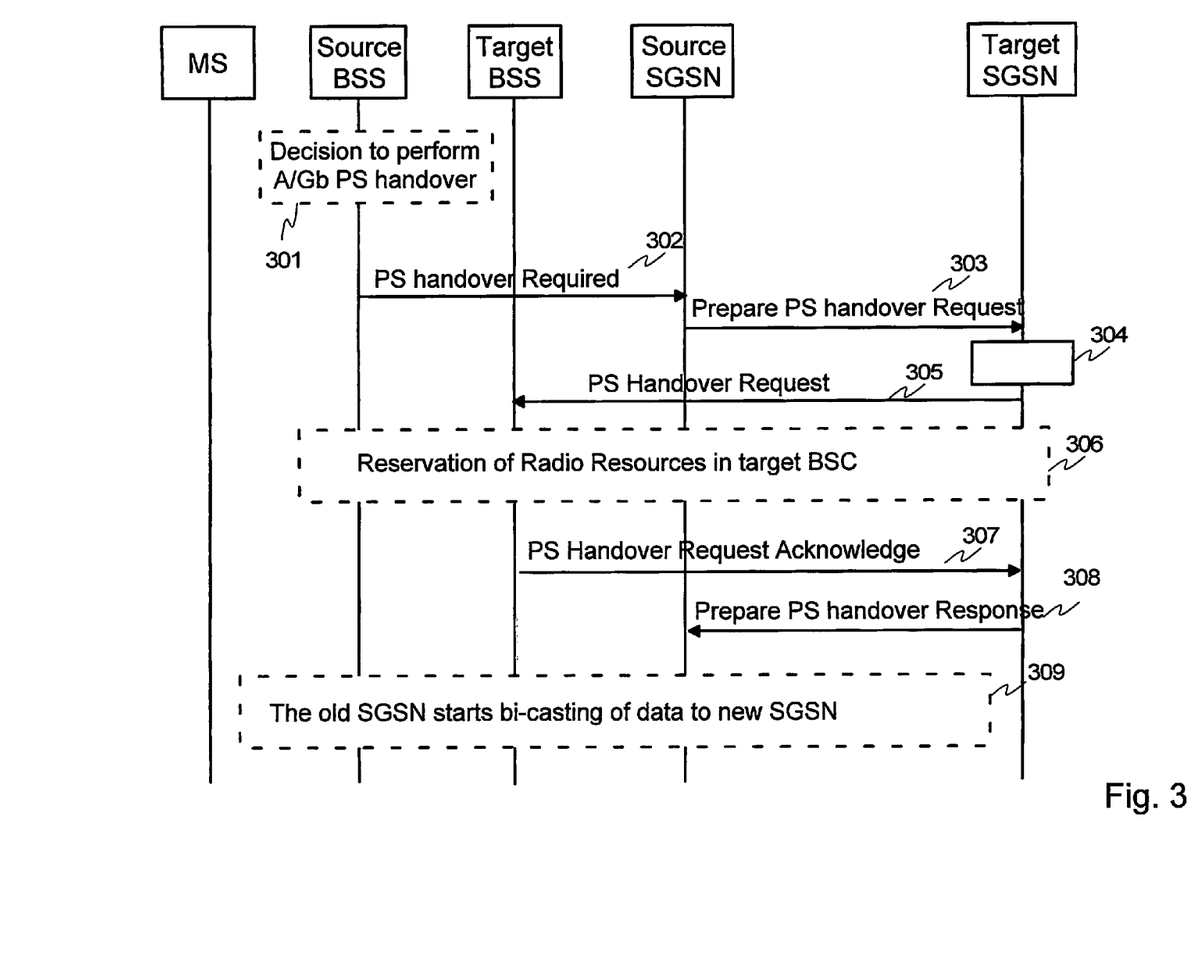
FIG. 3 shows a message sequence chart relating to a proposed packet-switched handover procedure.

FIG. 3 schematically illustrates, as an example of a packet-switched inter-SGSN handover, the preparation phase of an inter-SGSN PS handover in accordance with the above mentioned proposal. In phase 301, a source BSS makes a decision to perform an A/Gb PS Handover. The source BSS then sends a PS Handover Required message 302 to the source SGSN. This message 302 contains various identifiers, including a target cell identifier. Based on the target cell identifier, the source SGSN determines the target SGSN, and thereafter informs the target SGSN about the handover with Prepare PS Handover Request message 303. Upon receipt of this message, the target SGSN assigns a P-TMSI value for the mobile station in phase 304. Then the target SGSN send a PS Handover Request message 305 to the target BSS. In phase 306 radio resources are allocated in the target BSS for the packet-switched services relating to the mobile station. After radio resource allocation, the target BSS sends a PS Handover Request Acknowledgement 307 to the target SGSN. The target SGSN sends then a Prepare PS Handover Response message 308 to the source SGSN. In phase 309, the source SGSN starts bi-casting packet data to the target SGSN.

In the beginning of the execution phase of the proposed packet-switched handover, the P-TMSI value assigned by the target SGSN is delivered to the mobile station. In the end of the execution phase, a routing area update (RAU) procedure is carried out.

In the above discussed inter-SGSN packet-switched handover (FIG. 3), a target SGSN needs to assign a P-TMSI for the MS for the target cell before the MS is residing in the target cell. In addition to the above mentioned example, a SGSN may need to assign a new P-TMSI for a MS also in an intra-SGSN handover. This is the case, for example, when the source cell and the target cell belong to different routing areas (RA).

There are problems relating to this allocation of a P-TMSI by a target SGSN before a mobile station is residing in the target cell. P-TMSI handling procedures are defined in TS 24.008. In accordance with TS 24.008, an SGSN may assign a P-TMSI for a mobile station as part of Routing Area Update procedure or Attach procedure, or at any time by means of the P-TMSI reallocation. The term "attach" here refers to a procedure carried out when a mobile station attaches itself to the GPRS/EGPRS network. P-TMSI reallocation refers to allocating a new P-TMSI value for a mobile station residing in a certain cell. In accordance with TS 24.008, a P-TMSI is allocated to a mobile station when the mobile station is in the cell for which the P-TMSI is allocated.

More particularly, TS 24.008 specifies that when the network assigns a new P-TMSI value, the MS will keep the old P-TMSI value and the old Routing Area Identifier (RAI) value, until the MS receives in the downlink an LLC frame with the TLLI derived from the new P-TMSI value. In the uplink the MS uses a TLLI value derived from the new P-TMSI.

During the proposed packet-switched handover procedure, the MS residing still in the source cell has a P-TMSI, which is valid for the source cell. Therefore the MS in the source cell cannot accept the new P-TMSI value, as this new P-TMSI has been assigned for the target cell. Furthermore, the MS cannot use the new P-TMSI value for deriving a TLLI for sending data, because this new P-TMSI is assigned for the target cell.

Consequently, during the proposed packet-switched handover, the MS will have to keep and handle two P-TMSIs, the old P-TMSI assigned for the source cell and the new P-TMSI assigned for the target cell, until the MS resides in the target cell. These two P-TMSI values may be assigned by one SGSN (intra-SGSN handover involving routing area change) or by two SGSNs (inter-SGSN handover). In accordance with the P-TMSI handling procedure, it is only when the MS is residing in the target cell that the MS can replace the TLLI derived from the old P-TMSI assigned for the source cell with a TLLI derived from the new P-TMSI assigned for the target cell. Before replacing the old TLLI value with the new TLLI value, the MS has to acknowledge the acceptance of the new P-TMSI assigned for the target cell to the target SGSN. Currently there is no procedure for this acknowledgement. The proposed packet-switched handover procedure in combination with P-TMSI handling described in TS 24.008 will thus lead to an interruption in the data transfer.

For making the packet-switched handover in the proposed manner without data transfer interruptions, there is thus need for modifying P-TMSI handling procedures. Furthermore, there may be need for some changes also in the Routing Area Update procedures, as the BSS PFC (Packet Flow Context), MM, and PDP contexts need to be exchanged during the packet-switched handover procedure.

Furthermore, the mobile station should also be able to cope with possible failures in the handover procedure. An example of such a possible failure is that access in the target cell fails and the MS returns to the source cell. In this case the mobile station needs to keep the old P-TMSI as valid for some time after receiving a downlink LLC frame with the new TLLI.

One aim of the embodiments of the present invention is to address the above discussed problems relating to a packet-switched handover.

SUMMARY OF THE INVENTION

In accordance with a first aspect of the invention, there is provided a method for identifying resources in a cellular network, where a first identifier is used for identifying a mobile station and a second identifier is used for identifying resources allocated for packet-switched services for the mobile station, the method comprising the step of:

determining a value of a first type for the second identifier for a mobile station entering or having entered a second cell from a first cell, the first type of the second identifier being for use in both the first cell and the second cell for transmitting packet-switched data between the cellular network and the mobile station.

In accordance with a second aspect of the invention, there is provided a routing area update method for a cellular network, where a first identifier is used for identifying a mobile station and a second identifier is used for identifying resources allocated for packet-switched services for the mobile station, the method comprising the step of:

determining a value of a first type for the second identifier for a mobile station having entered a second cell from a first cell, the first type of the second identifier being for use in both the first cell and the second cell for transmitting packet-switched data between the cellular network and the mobile station.

In accordance with a third aspect of the invention, there is provided a packet-switched handover method for a cellular network, where a first identifier is used for identifying a mobile station and a second identifier is used for identifying resources allocated for packet-switched services for the mobile station, the method comprising the step of:

determining a value of a first type for the second identifier for a mobile station entering a second cell from a first cell, the first type of the second identifier being for use in both the first cell and the second cell for transmitting packet-switched data between the cellular network and the mobile station.

In accordance with a fourth aspect of the invention, there is provided a mobile station for a cellular network, the mobile station comprising means for storing a value of a first identifier identifying the mobile station and a value of a second identifier for identifying resources allocated for packet-switched services for the mobile station in the cellular network, and means for determining a value of a first type for the second identifier for the mobile station entering or having entered a second cell from a first cell, the first type of the second identifier being for use in both the first cell and the second cell for transmitting packet-switched data between the cellular network and the mobile station.

In accordance with a fifth aspect of the invention, there is provided a network element for a cellular network, the network element comprising means for storing a first identifier identifying a mobile station and a second identifier for identifying resources allocated for packet-switched services for the mobile station in the cellular network, and means for determining a value of a first type for the second identifier for a mobile station entering or having entered a second cell from a first cell, the first type of the second identifier being for use in both the first cell and the second cell for transmitting packet-switched data between the cellular access network and the mobile station.

In accordance with a sixth aspect of the invention, there is provided a cellular system comprising at least one network element as defined above.

BRIEF DESCRIPTION OF THE DRAWINGS

Embodiments of the present invention will now be described by way of example only with reference to the accompanying drawings, in which.

DETAILED DESCRIPTION OF THE PREFERRED EMBODIMENTS

FIGS. 1 to 3 have been discussed above in connection with the description of prior art.

In the following description of the embodiments of the invention, reference is often made to a GPRS or EGPRS system. It is, however, appreciated that the invention may be applicable to other cellular systems supporting packet-switched data services.

In accordance with the embodiments of the invention, a first identifier is assigned for a mobile station for packet-switched services. In a GPRS/EGPRS system, this first identifier is the P-TMSI. In addition, a second identifier is used for identifying resources allocated in the cellular system, more specifically in the access network of a cellular system, for packet-switched services of a mobile station. In a GPRS/EGPRS system this second identifier is the TLLI, which is used for identifying resources allocated for GPRS services at RLC/MAC layer on the Um interface and in the BSSGP layer on the Gb interface.

In accordance with the above discussed prior art, there is defined a local type for the TLLI identifier, for use in a cell for which a P-TMSI has been assigned by the SGSN. In accordance with embodiments of the invention, a new type for the TLLI, or more generally for the second identifier, is defined. This new type is valid both in the source cell and in the target cell for transmitting packet-switched data between the cellular network and the mobile station. In one embodiment of the invention, the new type is valid irrespective of there having been assigned a value of the first identifier for the target cell. This means that the new type of the second identifier may be used before and after a value for the first identifier is assigned for the target cell. In a further embodiment of the invention, the new type of the second identifier is for use in the source cell and in the target cell until a value of the first identifier assigned for the target cell is in use in the target cell. Taking a value of the first identifier in use in the target cell typically involves the network informing the mobile station about the value of the first identifier for the target cell and the mobile station acknowledging this value.

Using the TLLI and the P-TMSI identifiers as examples, it is thus possible to use the new type of the TLLI for packet data transfer in the source cell and in the target cell, for example, in the following circumstances relating to the value of the P-TMSI for the target cell. Firstly, the new type of TLLI may be used before a value of P-TMSI is assigned for the target cell. Secondly, the new type of TLLI may be used after a value of P-TMSI has been assigned for the target cell, but the mobile station is not yet aware of the P-TMSI value for the target cell. Thirdly, the new type of TLLI may be used after the mobile station has received information indicated the value of the P-TMSI for the target cell but the mobile station has not yet acknowledged this value.

In a further embodiment of the invention, this new type of the second identifier is valid in a source cell and in a target cell during a packet-switched handover or other procedure when the mobile station is changing cells, until a value of the first identifier is in use in the target cell. Typically the value of the first identifier for the target cell is in use in the target cell only after the MS has acknowledged the new value of the first identifier to the SGSN. In the following, this new type of the second identifier is called a handover type, for making this description more legible. This handover type is, however, not restricted to be used only in connection with a packet-switched handover, but may be used in connection with other procedures. As an example, use of the handover type of the second identifier in connection with a routing area update is discussed below.

It is possible to use the new type of the second identifier to transmit packet data in connection with cell changes; the same identifier value of the new type may be used both in the source cell and in the target cell. A further advantage is that it is possible to detect signaling and packet data subject to packet-switched handover. This is because the packet data and at least some of the signaling messages carry the value of the new type of the second identifier.

The second identifier may have a second type for use in a cell where a value of the first identifier is in use. The TLLI identifier, for example, has the local type. Furthermore, the second identifier may have a third type for use in a cell where a value of the first identifier has not been assigned for this specific cell, although a value of the first identifier has been in use in another cell. The TLLI identifier, for example, has the foreign type. The new type of the second identifier is different from both these types as it can be used in two cells. The new type can be used in a cell where a value of the first identifier is in use. In addition, the new type can be used also in a cell where a value of the first identifier has not been assigned for this specific cell, although a value of the first identifier has been in use in another cell.

Figure 4:
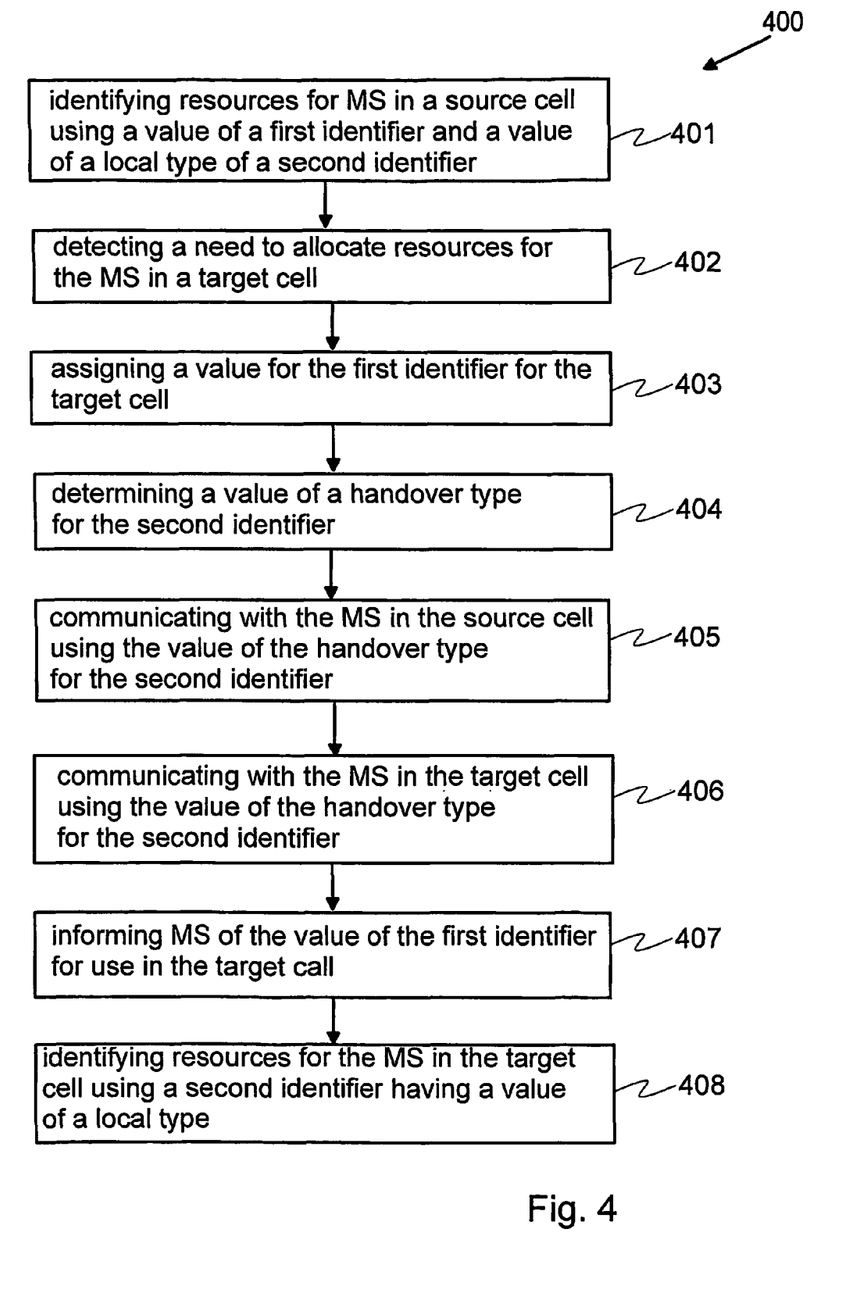
FIG. 4 shows a flowchart of a method in accordance with an embodiment of the invention.

FIG. 4 shows a flowchart of a method 400 in accordance with an embodiment of the invention. In step 401, the mobile station is communicating with a first cell (a source cell) of the cellular network. A value of the first identifier assigned for the source cell is used for identifying the mobile station in the source cell. A value of a local type of the second identifier is used for identifying the resources allocated to the mobile station in the source cell. Typically, the value of the second identifier is determined from the value of the first identifier.

The mobile station is changing cells from a first cell to a second cell, for example after receiving a handover command or after itself detecting a need to change cells. In step 402, a need is detected for allocating resources for the mobile station in a second cell (a target cell). Typically this need to allocate resource is detected by receiving a protocol message indicating that the mobile station is changing cells. The protocol message may relate, for example, to a routing area update procedure or to a packet-switched handover procedure.

In step 403, a value for the first identifier for use in the target cell is assigned. In step 404, a value of the handover type is determined for the second identifier. In some embodiments of the invention, this value of the handover type is determined based on the value of the first identifier assigned for the source cell. Alternatively, the value of the handover type may be determined based on any other information, which is accessible by the cellular network and by the mobile station at this point. Typically the temporary value of the handover type cannot be determined based on the value of the first identifier assigned for the target cell, as the mobile station being still in the source cell is unaware of that value at this point.

In step 405, communications with the mobile station in the source cell are carried out using the value of the handover type of the second identifier. Similarly, in step 406 communications with the mobile station in the target cell are carried out using the value of the handover type of the second identifier.

In step 407, the mobile station is informed about the value of the first identifier assigned for the target cell. Thereafter the mobile station can typically determine a value of a local type for the second identifier for the target cell. In step 408, communications with the mobile station in the target cell are carried out using the local type value of the second identifier.

It is appreciated that although method 400 contains steps 401 and 405, where a mobile station communicates with a source cell, these steps can be discarded. The handover type of the second identifier may be applicable also in procedures, where a mobile station is already residing in a target cell. In this description, a packet-switched handover is used as an example of a procedure, where a mobile station is moving from the source cell to the target cell and where the handover type of the second identifier is applicable. A routing area update procedure is discussed as example of a procedure, where the mobile station is residing in the target cell and the handover type of the second identifier is applicable.

With respect to the order of steps in method 400, the order of steps explained in connection with FIG. 4 corresponds to a packet-switched handover. It is possible to perform the steps in slightly different order. For example, in the routing update procedure step 403 is performed only after step 406.

Figure 5A:
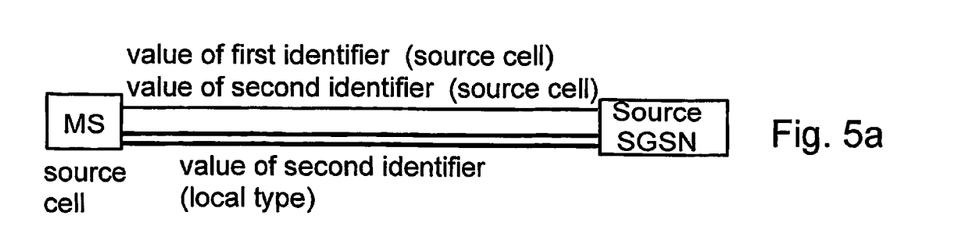
FIG. 5 shows schematically data transfer during packet-switched handover in accordance with an embodiment of the invention.
Figure 5B:
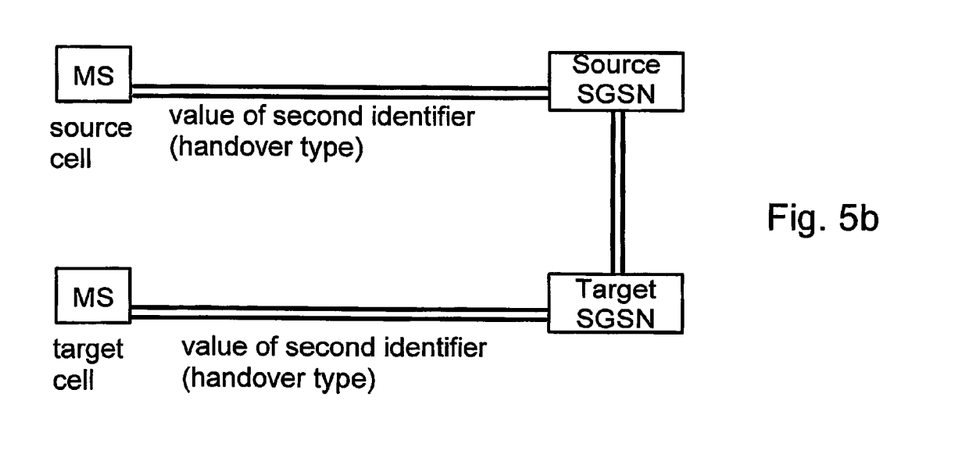
Figure 5C:
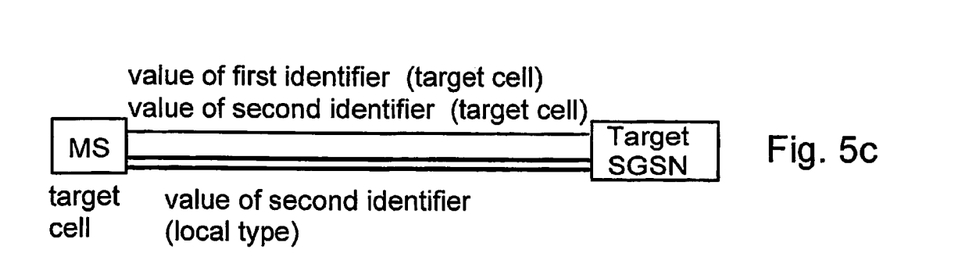

FIG. 5 shows schematically data transfer during packet-switched intra-SGSN handover in accordance with an embodiment of the invention. In FIGS. 5*a* and 5*c*, the thin lines indicate the logical links between the mobile stations and the SGSNs. The thick lines indicate packet data transfer, and the identifier values used for the packet data transfer are indicated also.

FIG. 5*a* shows the situation before the packet-switched handover. The source SGSN has assigned a value for the first identifier for use in the source cell. A value for the second identifier has been determined, typically based on the value of the first identifier assigned for the source cell. The value of the second identifier is of the local type. Packet-data transfer uses the local type value of the second identifier in the source cell in FIG. 5*a*.

In FIG. 5*b*, the values and types of the second identifier used for packet data transfer are shown during a packet-switched handover procedure. Both in the source cell and in the target cell a value of the handover type is used for packet data transfer. With respect to the logical links, the source SGSN and the MS know the previously determined values for the first and second identifiers for the source cell. The target SGSN has assigned a value for the first identifier for the target cell, but typically the mobile station is not yet aware of this value. The target SGSN may also have determined a value of a local type for the second identifier.

FIG. 5*c* shows the situation after a packet-switched handover. The mobile station is in the target cell. The value of the first identifier assigned for use in the target cell has been sent to the mobile station, and packet-data transfer uses the local type value of the second identifier in the target cell. This local type value for the second identifier is typically determined using the value of the first identifier.

For the GPRS/EGPRS systems, the handover type for the TLLI identifier (or, briefly, Handover TLLI) may be defined and standardized by using the principles mentioned in TS 23.003. The following discussion concentrates on handling of the TLLI and P-TMSI identifier, but the same principles are applicable also more generally.

In some embodiments of the invention especially applicable to GPRS/EGPRS systems, the Handover TLLI is computed independently by each of the nodes involved in a packet-switched handover from the source P-TMSI, in other words from the P-TMSI value in use by the MS upon detection of a need for a packet-switched handover. The Handover TLLI, similarly as the other defined TLLI types, consists of 32 bits, numbered from 0 to 31 by order of significance, with bit 0 being the LSB. The Handover TLLI may be defined as shown in Table 1 in FIG. 6. In Table 1, the left-most six columns specify the bits of the TLLI identifier. The column on the right specifies the type of the TLLI identifier.

Figure 6:
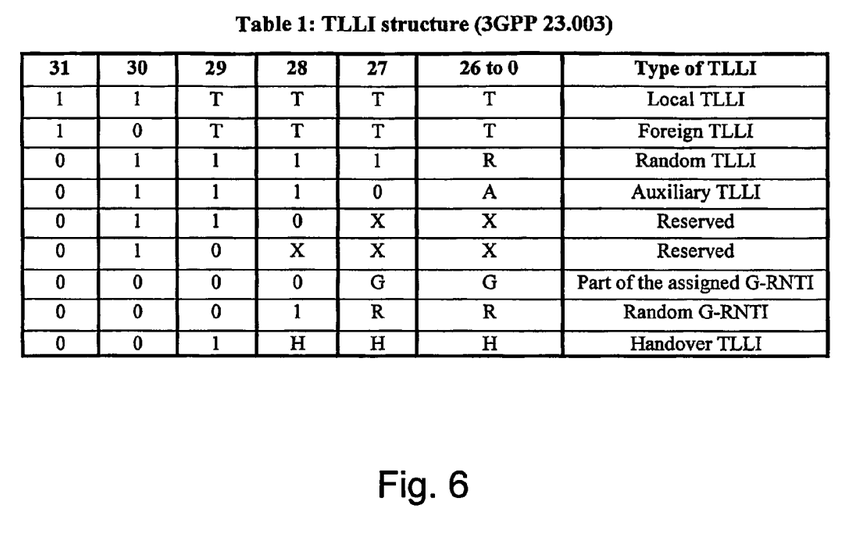
FIG. 6 shows a table relating to identifier values and types in accordance with a further embodiment of the invention.

In Table 1, as discussed in TS 23.003, 'T', 'R', 'A' and 'X' indicate bits that can take any value for the type of TLLI. More precisely, 'T' indicates bits derived from a P-TMSI, 'R' indicates bits chosen randomly, 'A' indicates bits chosen by the SGSN, 'G' indicates bits derived from the assigned G-RNTI and 'X' indicates bits in reserved ranges. 'H' bits, similarly as 'T' bits, indicate bits derived from a P-TMSI.

As mentioned above, the Handover TLLI may be determined independently by an MS and a SGSN that have a valid P-TMSI. The Handover TLLI may be determined as Table 1 in FIG. 6 indicates. In other words, bits 31 down to 30 are set to 0;
bit 29 is set to 1 and
bits 28 down to 0 are set equal to bits 28 to 0 of the P-TMSI assigned for the source cell.

Handover TLLI may be built from the P-TMSI because, as discussed below in detail, the source P-TMSI is known and kept by all the nodes involved in packet-switched handover in the source cell and the target cell.

It is appreciated that the table in FIG. 6 does not represent the only possible way to determine a value for the Handover TLLI. However, this definition is done considering the definition of the local and foreign TLLI, to differentiate handover TLLI from these values. Depending on whether the packet-switched handover is an intra-SGSN or inter-SGSN there are two procedures defined for Handover TLLI handling. Both an intra-SGSN and an inter-SGSN packet-switched handover are below discussed with reference to FIG. 7.

Figure 7:
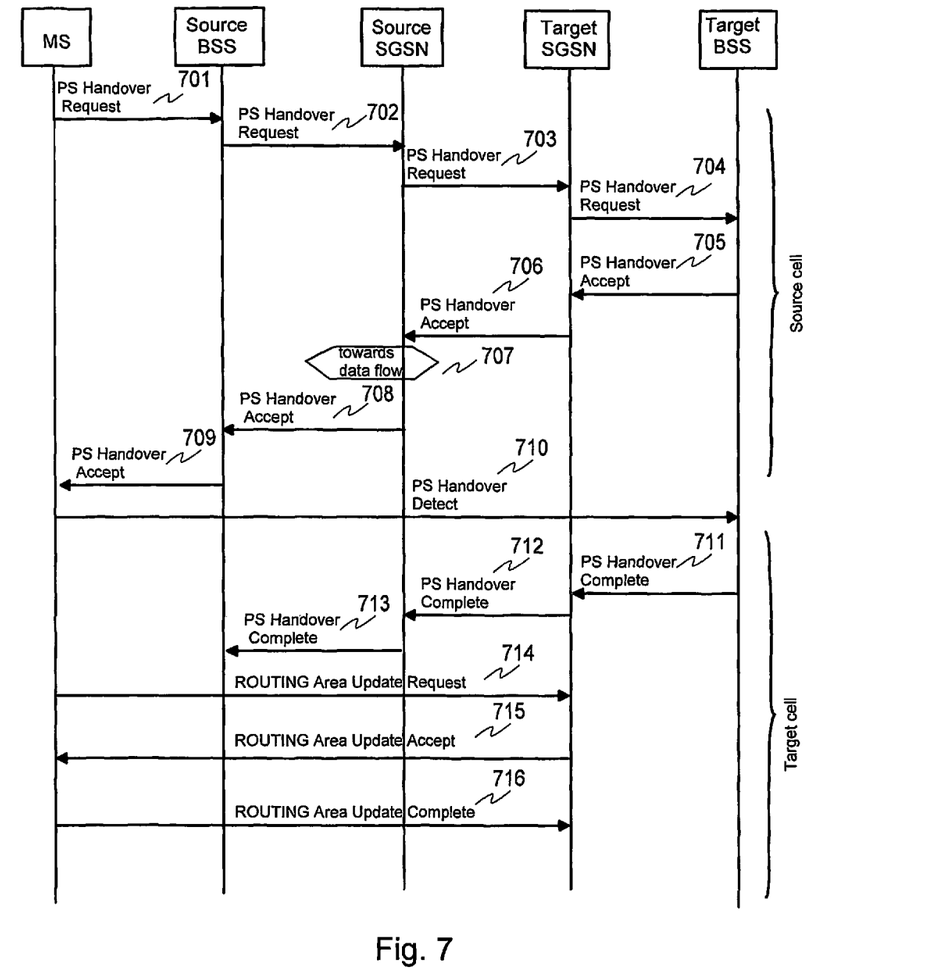
FIG. 7 shows a message sequence chart relating to a packet-switched handover in accordance with an embodiment of the invention.

FIG. 7 shows a message sequence chart relating to a packet-switched inter-SGSN handover in a GPRS/EGRPS system. The names of the PS handover protocol messages in FIG. 7 are intended to be illustrative. The PS handover messages in FIG. 7 do not refer to any specific protocol. The PS handover messages may be, for example, messages in accordance with the proposal "Support of Conversational Services over the PS domain; Technical Report (Release 6)" version 0.7.0. It is furthermore clear to a person skilled in the art that the names of the protocol messages may be different in different implementations. It is also evident to a person skilled in the art that various identifier values and other information need to be present in the protocol messages relating to a PS handover. This information is not discussed in detail below, as the present invention is targeted to the handling of the Handover TLLI or, more generally, to the handling of the defined new type for an identifier identifying resources allocated for packet-switched services in a cellular access network.

The intra-SGSN packet-switched handover with Handover TLLI is discussed first, although FIG. 7 illustrates the inter-SGSN packet-switched handover. In an intra-SGSN packet-switched handover, only one SGSN is involved. Messages 703, 706 and 712 may therefore be discarded.

In accordance with FIG. 7, a packet-switched handover procedure may be initiated by the network based on the information it receives from a mobile station, illustrated with PS Handover Request message 701 to the source BSS. The mobile station, for example due to poor signal quality in the source cell, may decide to change cells. The source BSS initiates a PS handover procedure by sending the PS Handover Request message 702 to the SGSN for informing the SGSN about the need for a packet-switched handover. It is alternatively possible that the packet-switched handover procedure is initiated by the source BSS, for example based on measurement results the MS is sending to the source BSS.

Upon receipt of the PS Handover Request message 703, the SGSN determines a Handover TLLI for the target cell. If needed, the SGSN may assign a new value for the P-TMSI for the target cell. It is possible that the SGSN assigns a new value for the P-TMSI even when a routing area is not changed. The SGSN uses this Handover TLLI to address resources in the target cell and to create BSS Packet Flow Context (PFC) for packet data flows relating to the MS. The SGSN uses this Handover TLLI also for data transfer to the MS in the source and target cells and also in bi-casting for the duration of the PS handover procedure. For the duration of the PS handover procedure SGSN will keep {P-TMSI assigned earlier, TLLI relating to the P-TMSI assigned earlier, P-TMSI assigned during PS HO (when assigned), Handover TLLI}.

As FIG. 7 shows, the signaling relating to the PS handover continues by the SGSN sending a PS Handover Request message 704 to the target BSS. The target BSS, after receiving this message, assigns resources for the packet-switched services. As mentioned above, the Handover TLLI is used for identifying the resources. Upon successful—or at least partially successful—resource allocation the target BSS send a PS Handover Accept message 705 to the SGSN.

Thereafter the SGSN sends a PS Handover Accept message 708 to the source BSS, and the source BSS send a PS Handover Accept message 709 to the MS. The SGSN upon sending the PS Handover Accept message 708 derives the Handover TLLI. Thereafter the SGSN uses the Handover TLLI in the downlink data transfer to both source and target cells. The MS derives the Handover TLLI from its P-TMSI upon receiving an indication of successful resource allocation in the target cell from the BSS, thus upon receiving the PS Handover Accept message 709 in FIG. 7. The MS uses the Handover TLLI for uplink data transfer in both source and target cell. Before this, the MS uses the local TLLI for uplink and downlink data transfer in the source cell. For the rest of the duration of the PS handover procedure the mobile station will keep {P-TMSI assigned earlier for the source cell, local TLLI based on the P-TMSI assigned earlier for the source cell, Handover TLLI}. The MS uses the Handover TLLI in the target cell for uplink data transfer until the completion of the Routing Area Update procedure. The Routing Area Update procedure is carried out as a part of packet-switched handover when a routing area changes. The MS will use the Handover TLLI in the target cell until is receives the P-TMSI allocated for the target cell. Thereupon the MS will determine a local TLLI value for use in packet data transfer in the target cell.

Upon reception of the PS Handover Accept message 709, the mobile station will move to the target cell. The mobile station sends a PS handover Detect message 710 to the target BSS. The target BSS send a PS Handover Complete message 711 to the SGSN. The SGSN sends a PS Handover Complete message 713 to the source BSS.

After successful initial access in the target cell, the mobile station also sends a Routing Area Update Request message 714 to the SGSN. The parameters of this message 714 include the P-TMSI assigned earlier for the source cell, the source RAI, the P-TMSI Signature and Update Type. Based on the P-TMSI value, the SGSN recognized that the mobile station is subject to a PS handover. The SGSN sends to the mobile station a Routing Area Update Accept message 715. This message 715 contains the P-TMSI value assigned for the target cell during the packet-switched handover procedure.

The mobile station acknowledges the P-TMSI for the target cell by sending a Routing Area Update Complete message 716 to the SGSN.

Upon sending and receiving the Routing Area Update Complete message 716, the mobile station and the SGSN replace the Handover TLLI with a local TLLI derived from the P-TMSI assigned for the target cell following the P-TMSI handling procedures in TS 24.008. This means that the MS keeps the source P-TMSI/TLLI and the Handover TLLI valid until the MS receives an LLC frame from the network with a local TLLI for the target cell. The SGSN keeps the source P-TMSI and Handover TLLI as valid, until the SGSN receives an LLC frame from the MS with the local TLLI for the target cell.

The source and target BSS may handle the Handover TLLI in the same manner as they handle any other TLLI type, that is to say in accordance with TS 08.18. TS 08.18 specifies the following: The SGSN provides the source BSS and the target BSS with a current TLLI identifying resources relating to the mobile station. If a SGSN provide a second TLLI for this mobile station, the first TLLI is considered as an old TLLI. The old TLLI is used by the BSS to locate an MS's context. It is noted that the old TLLI is an optional information element in the packet data unit. Subsequent data transfer from the MS uses the second, new TLLI.

This means that in the source cell, the source BSS replaces the local TLLI derived from the P-TMSI assigned for the source cell with the Handover TLLI sent from the SGSN. In the target cell, the target BSS has first the Handover TLLI to address the resources for the MS. The target BSS receives the local TLLI derived from the P-TMSI assigned for the target cell after the RAU procedure, when the SGSN receives the Routing Area Update Complete message 716.

The MS and the SGSN, even though they use the Handover TLLI, may still receive data with the local TLLI derived from the P-TMSI assigned before the beginning of the PS handover procedure. This feature is needed in case of a PS handover failure.

An inter-SGSN packet-switched handover with Handover TLLI is discussed next with reference to FIG. 7. The message sequence is similar to that discussed above for messages 701 and 702. Thereafter the source SGSN sends a PS Handover Request message 703 to the target SGSN. The target SGSN preferably treats this PS Handover Request message 703 as an implicit RAU Request, and assigns a P-TMSI for the target cell. Implicit RAU request refers to a set of the information elements similar to those in a RAU Request defined in [TS 24.008] that may be part of the PS handover Request Message 703. Upon receipt of the PS Handover Request message 703, the target SGSN determines a Handover TLLI based on the P-TMSI assigned earlier for the source cell. The target SGSN will use this Handover TLLI to address resource in the target cell and to create BSS Packet Flow Context (PCF) for packet data flows relating to the MS. The target SGSN will use this Handover TLLI also for data transfer to the MS in the target cell before the PS handover procedure is completed. For the duration of the PS handover procedure that target SGSN will keep {source P-TMSI, target P-TMSI, Handover TLLI}.

As FIG. 7 shows, the signaling relating to the PS handover continues by the target SGSN sending a PS Handover Request message 704 to the target BSS. The target BSS, after receiving this message, assigns resources for the packet-switched services. As mentioned above, the Handover TLLI is used for identifying the resources. Upon successful—or at least partially successful—resource allocation the target BSS send a PS Handover Accept message 705 to the target SGSN. The target SGSN sends to the source SGSN a PS Handover Accept message 706. The target SGSNs may handle this message as an implicit RAU Accept message. Implicit RAU accept refers to a set of the information elements similar to those in a RAU Accept defined in [TS 24.008] that may be part of the PS handover Request Message 706.

When the source SGSN receives the PS Handover Accept message 706, it determines a Handover TLLI and uses this Handover TLLI instead of a local TLLI in the data transfer towards the MS and the target SGSN for forwarded data flows, step 707 in FIG. 7. The source SGSN will keep {source P-TMSI, source TLLI, Handover TLLI} for the duration of the PS handover procedure.

Thereafter the source SGSN sends a PS Handover Accept message 708 to the source BSS, and the source BSS send a PS Handover Accept message 709 to the MS. The MS upon receiving the PS Handover Accept message 709 determines a Handover TLLI and uses the Handover TLLI for uplink data transfer. For the rest of the duration of the PS handover procedure, the mobile station will keep {source P-TMSI, source TLLI, Handover TLLI}. The MS will use the Handover TLLI in the target cell for uplink and downlink data transfer until the completion of the Routing Area Update procedure. In other words, the MS will use the Handover TLLI in the target cell until is receives the P-TMSI allocated for the target cell. Thereupon the MS will determine a local TLLI value for use in packet data transfer in the target cell.

Upon reception of the PS Handover Accept message 709, the mobile station will move to the target cell. The mobile station sends a PS handover Detect message 710 to the target BSS. The target BSS send a PS Handover Complete message 711 to the target SGSN, which in turn sends a PS Handover Complete message 712 to the source SGSN. The target SGSN interprets the message 711 as an implicit RAU Complete message. The source SGSN sends a PS Handover Complete message 713 to the source BSS. This message 713 terminates the PS Handover procedure for the source SGSN and the source BSS.

After successful initial access in the target cell, the mobile station sends a Routing Area Update Request message 714 to the target SGSN. The parameters of this message 714 include the source P-TMSI, the source RAI, the source P-TMSI Signature, and Update Type. Because the message 703 was interpreted as an implicit RAU request, the target SGSN has already the PDP and MM context for this mobile station. Based on the source P-TMSI value, the target SGSN recognized that the mobile station is subject to a PS handover. The target SGSN sends to the mobile station a Routing Area Update Accept message 715. This message 715 contains the P-TMSI value assigned for the target cell. The mobile station acknowledges the P-TMSI for the target cell by sending a Routing Area Update Complete message 716 to the target SGSN.

Upon sending and receiving the Routing Area Update Complete message 716, the mobile station and the target SGSN replace the Handover TLLI with a local TLLI derived from the P-TMSI assigned for the target cell following the P-TMSI handling procedures in TS 24.008. This means that the MS keeps the source P-TMSVTLLI and the Handover TLLI valid until the MS receives an LLC frame from the network with a local TLLI for the target cell. The target SGSN keeps the source P-TMSI and Handover TLLI as valid, until the target SGSN receives an LLC frame from the MS with the local TLLI for the target cell.

The source and target BSS may handle the Handover TLLI in the same manner as they handle any other TLLI type, that is to say in accordance with TS 08.18. TS 08.18 specifies the following. The source SGSN and the target SGSN provide the source BSS and the target BSS, respectively, with current TLLI identifying resources relating to the mobile station. If a SGSN provide a second TLLI for this mobile station, the first TLLI is considered as an old TLLI. The old TLLI is used by the BSS to locate an MS's context. It is noted that the old TLLI is an optional information element in the packet data unit. Subsequent data transfer from the MS uses the second, new TLLI.

This means that in the source cell, the source BSS replaces the local TLLI derived from the P-TMSI assigned for the source cell with the Handover TLLI sent from the source SGSN. In the target cell, the target BSS has first the Handover TLLI to refer to the MS's contexts. The target BSS receives the local TLLI derived from the P-TMSI assigned for the target cell after the RAU procedure, when the target SGSN receives the Routing Area Update Complete message 716.

A packet-switched handover may fail due to various reasons, for example, due to lack of resources in the target cell or due to failure in the initial access in the target cell. The initial access in the target cell affects the Handover TLLI handling, because as a result of this failure MS may go back to the source cell. If the initial access fails, the MS returns to the source cell and sends a Packet Cell Change Failure message with the appropriate cause as described in TS 44.060. Currently, if MS was involved in simultaneous uplink and downlink packet transfer mode (or MAC-shared state) before the cell change it will, when going back to the source cell, establish a new uplink temporary block flow (TBF) and send a Packet Cell Change Failure message on this TBF and resume its uplink transfer.

In order to make the PS handover failure recovery as smooth as possible, both the MS and source SGSN may keep the P-TMSI and TLLI assigned for the source cell until the completion of the RAU procedure in the target cell. This enables the MS to return to the source cell and to continue seamlessly using the P-TMSI and TLLI assigned for the source cell without having to perform a RAU procedure in order to get a new P-TMSI for the source cell. Furthermore the resources in the source cell may be kept until the source SGSN and the source BSS receive an indication of a completed PS handover procedure.

Thus in the case of a PS handover failure, a MS returning to the source cell may use the TLLI relating to the source cell for addressing resources.

Another advantage of keeping the P-TMSI and TLLI values relating to the source cell until the PS handover procedure is complete is that in this way P-TMSI handling and RAU procedures defined in [TS 24.008] remain intact.

As a comparison to a packet-switched handover without the use of a Handover TLLI, it is noted that the 3GPP Release 6 allows packet data reception between the messages 714 and 715 using a foreign TLLI. In addition, the MS may send and receive packet data in the source cell between the messages 701 and 709 using a local TLLI. As mentioned in connection with the prior art discussion, the packet-switched handover without a Handover TLLI would require changes to the P-TMSI handling procedures and to MM procedures.

The use of the Handover TLLI enables packet data transfer in the target cell between the messages 709 and 715. In the source cell, the mobile station may send and receive packet data using a local TLLI between the messages 701 and 709. In the target cell the mobile station may send data using Handover TLLI upon receipt of message 709 until message 715 and receive data from step 707 to message 715.

Figure 8:
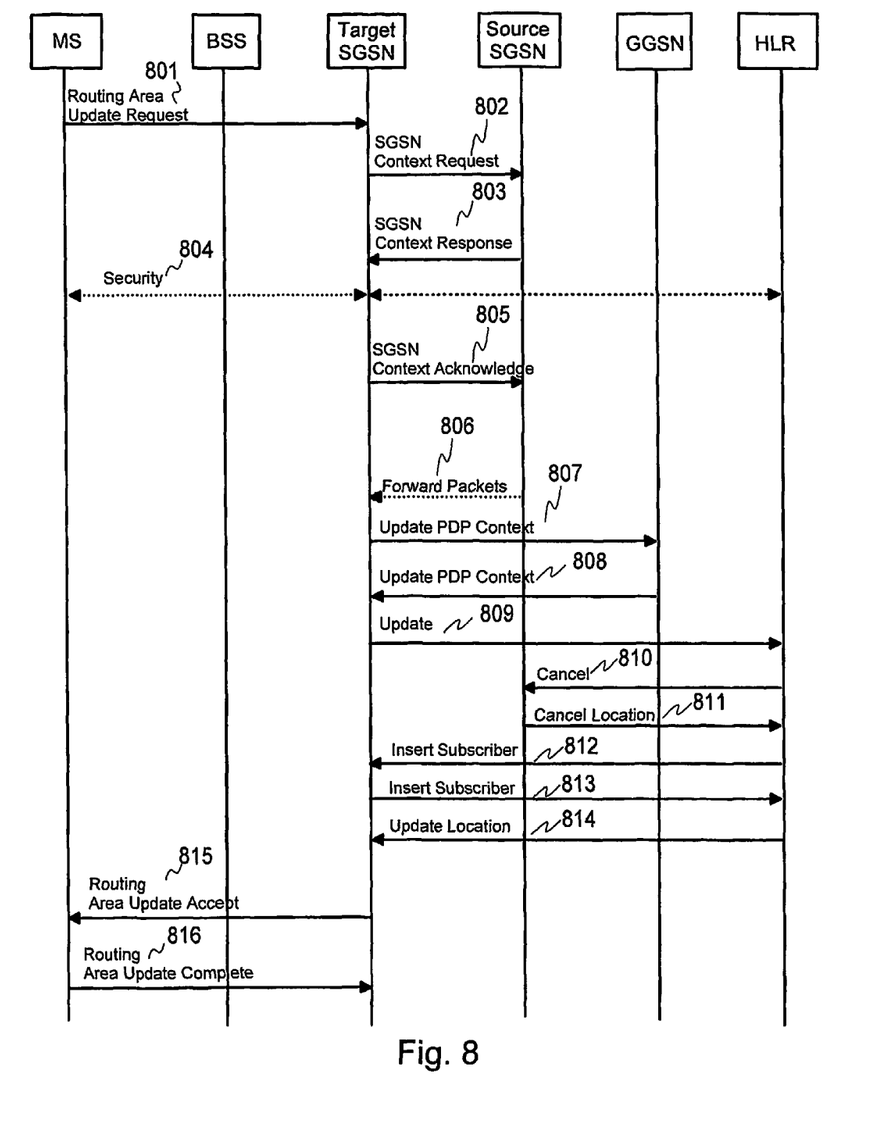
FIG. 8 shows a message sequence chart relating to a routing area update procedure in accordance with an embodiment of the invention.

FIG. 8 shows a message sequence chart relating to a routing area update procedure, where a Handover TLLI is used. The use of a Handover TLLI enables uplink data transfer during routing area update procedure, and thus enables reduced service interruption times with respect to TS 24.008.

In accordance with TS 24.008 Release 6, user data transmission in the MS is suspended during the routing area updating procedure and user data reception in the MS is possible. User data transmission in the network may be suspended during the routing area updating procedure.

These restrictions in TS 24.008 in the uplink transfer apply due to the P-TMSI allocation, which is needed in order to derive a valid TLLI for resource addressing. Uplink data transfer is also interrupted in the case of negotiating SNDCP exchange identity (XID) parameters in accordance with TS 44.065 upon NSAPI initialization (during Inter-SGSN RAU). This interruption, however, will be almost negligible considering that SNDCP XID parameter negotiation is a one step procedure. As of 3GPP Release 6, TS 24.008, network may allow downlink data transfer during RAU procedures. In this case the network uses foreign TLLI for sending downlink data in the target cell.

As shown in FIG. 8, the routing area update procedure begins with the mobile station sending a Routing Area Update Request message 801 to a target SGSN. The mobile station notices a need for a routing area update because a cell (target cell), which it has entered, has a different routing area identifier (RAI) than a previous cell (source cell). After sending Routing Area Update Request message 801, the mobile station derives the handover TLLI from the P-TMSI assigned for the source cell. The mobile station starts using the Handover TLLI for the uplink transfer in the target cell immediately or after the completion of Security step 804. When the target SGSN receives the Routing Area Update Request message 801, the target SGSN derives the Handover TLLI from the P-TMSI assigned for the source cell. The target SGSN uses the Handover TTLL in all subsequent data transfer, SGSN bi-casting included. SNDCP XID parameter negotiation between the MS and SGSN should be done prior to uplink data transfer.

The routing area update continues, as FIG. 8 shows, by the target SGSN sending a SGSN Context Request message 802 to a source SGSN. The source SGSN replies with a SGSN Context Response message 803. Thereafter a security procedure 804 is typically carried out. The target SGSN, the mobile station and the Home Location Register (HLR) are involved in the security procedure 804. After the security procedure 804, the target SGSN sends an SGSN Context Acknowledgement message 805 to the source SGSN. Thereafter the source SGSN starts forwarding packets to the target SGSN (arrow 806 in FIG. 8) The target SGSN sends an Update PDP Context message 807 to a Gateway GSN, and the GGSN replies with an Update PDP Context message 808. Thereafter the target SGSN sends an Update message 809 to the HLR. The HLR and the source SGSN communicate using a Cancel message 810 and a Cancel message 811. Thereafter subscriber information is delivered to the target SGSN by sending an Insert Subscriber message 812 from the HLR to the target SGSN. The target SGSN acknowledges the message 812 with an Insert Subscriber message 813. Thereafter the HLR send an Update Location message 814 to the target SGSN.

Once the target SGSN has received the message 814, the target SGSN assigns a P-TMSI for the mobile for the target cell in accordance with the RAU procedure. Thereafter the target SGSN sends a Routing Area Update Accept message 815 to the mobile station. In this Routing Area Update Accept message 815 the P-TMSI value for the target cell is indicated. The Routing Area update Accept message 815 contains also a Receive N-PDU number defined in TS 44.065. The Receive N-PDU number contains the acknowledgements for each acknowledged-mode NSAPI used by the MS, thereby confirming all mobile-originated N-PDUs successfully transferred up to the time of sending this message instead of before the start of the routing area update procedure as is currently defined TS 23.060. The Receive N-PDU number in the Routing Area Update Complete message 816, send by the mobile station to the target SGSN, contains the acknowledgements for each acknowledged-mode NSAPI used by the MS, thereby confirming all mobile-terminated N-PDUs successfully transferred before the MS has received the Routing Area Update Accept message 815, instead of before the start of the procedure as is currently.

As defined in TS 23.060, if the Receive N-PDU Number confirms reception of N-PDUs that were forwarded from the source SGSN, these N-PDUs shall be discarded by the target SGSN. After this LLC and SNDCP in the MS are reset and local TLLI derived from the P-TMSI value assigned for the target cell is used.

When the Handover TLLI is used during the RAU procedure, the service interruption is only for a short time interval, that is from the receipt of Routing Area Update Accept message 815 until the transmission of Routing Area Update Complete message 816 similarly as during P-TMSI reallocation procedures. Without the use of the Handover TLLI, the service interruption in accordance with TS 24.008, TS 23.060 is from sending the message 801 until receiving the message 815.

It is appreciated that although FIG. 8 relates to an inter-SGSN routing area update, the use of Handover TTLI reduces service interruption times also in intra-SGSN routing area updates.

In comparison to a routing area update procedure without the Handover TLLI, it is noted that [TS 24.008, 3GPP Release 6] defined optional downlink data transfer to a mobile station using a foreign TLLI from the message 806 onwards until the reception of the message 815. With a Handover TLLI, data transfer is possible in uplink and downlink directions after the security procedure 804 until the reception of the message 815.

As is evident to a person skilled in the art from the discussion relating to packet-switched handover and routing area update procedure, by defining this new type for the TLLI identifier, there is no need for changing the P-TMSI handing procedures or the MM procedures. Some minor changes are needed for the Receive N-PDU Number handling in the routing area update procedure for handling the data transfer efficiently.

It is appreciated that a cellular network, a network element for a cellular network and a mobile station for a cellular network may be configured to implement any method in accordance with the embodiments of the invention. Typically this may be done by updating suitable software to the relevant network elements or to the mobile station. The software then controls the functionality of the network element or the mobile station. Alternatively, suitably designed hardware can be used to implement embodiments of the invention.

It is appreciated that although the embodiments of the invention have been discussed in connection with GPRS and EGPRS system and network elements named in accordance with the naming conventions of these systems, the invention is not restricted to a GPRS or EGPRS system or a SGSN network element. The invention may be applicable in other cellular systems supporting packet-switched data transfer and where network elements have other names.

It is furthermore appreciated that a packet-switched handover procedure and a routing area update procedure are discussed above as examples of procedures, where the present invention is applicable. The intent of the examples is not to restrict the invention only to packet-switched handover procedures or routing area update procedures. The invention may be applicable also in other procedures. Furthermore, routing area update procedure or a packet-switched handover procedure may employ any method of identifying resources in accordance with the invention.

It is also appreciated that the detailed descriptions of a packet-switched handover procedure and of a routing area update procedure are to be understood as examples of these procedures. The intent is not to limit packet-switched handover procedures or routing area update procedures in accordance with the invention to specific procedures described above.

It is appreciated that the new type of the second identifier may be valid for use also in further cells than in the source cell and in the target cell.

Although preferred embodiments of the apparatus and method embodying the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claimed is:

1. A method for identifying resources in a cellular network, comprising:
   communicating first packet-switched data between a mobile station and a first cell using a first value of a first identifier and a first value of a local type of a second identifier, wherein the mobile station is identified using the first value of the first identifier, and further wherein resources allocated for packet-switched services for the mobile station are identified using the first value of the local type of the second identifier;
   communicating second packet-switched data between the mobile station and the first cell using a value of a handover type of the second identifier different from the first value of the local type of the second identifier, wherein the resources allocated for the packet-switched services for the mobile station in the first cell are identified using the value of the handover type of the second identifier;
   communicating third packet-switched data between the mobile station and a second cell using the value of the handover type of the second identifier, wherein the resources allocated for the packet-switched services for the mobile station in the second cell are identified using the value of the handover type of the second identifier; and
   communicating fourth packet-switched data between the mobile station and the second cell using a second value of the first identifier and a second value of the local type of the second identifier different from the value of the handover type of the second identifier, wherein the mobile station is identified using the second value of the first identifier, and further wherein resources allocated for packet-switched services for the mobile station are identified using the second value of the local type of the second identifier.

2. The method of claim 1, further comprising, receiving the second value of the first identifier assigned to the mobile station at the mobile station.

3. The method of claim 2, further comprising determining the second value of the local type of the second identifier based on the received second value of the first identifier at the mobile station.

4. The method of claim 2, further comprising sending an acknowledgement message acknowledging receipt of the second value of the first identifier.

5. The method of claim 2, wherein the first value of the local type of the second identifier is determined based on the first value of the first identifier.

6. The method of claim 5, wherein the value of the handover type of the second identifier is determined based on the first value of the first identifier.

7. The method of claim 1, further comprising communicating the fourth packet-switched data after completion of a routing area update procedure.

8. The method of claim 1, further comprising communicating the fourth packet-switched data after completion of a handover procedure.

9. The method of claim 1, wherein communicating the first packet-switched data comprises uplink and downlink transfer of the first packet-switched data.

10. The method of claim 1, wherein communicating the second packet-switched data comprises uplink transfer of the second packet-switched data.

11. The method of claim 1, wherein communicating the third packet-switched data comprises uplink and downlink transfer of the third packet-switched data.

12. The method of claim 1, wherein the first identifier is a temporary mobile subscriber identifier.

13. The method of claim 1, wherein the second identifier is a temporary logical link identifier.

14. The method of claim 1, wherein the mobile station is for a general packet radio service or for an EDGE general packet radio service.

15. The method of claim 1, further comprising receiving an indication at the mobile station of a successful resource allocation in the second cell.

16. A method for identifying resources in a cellular network, comprising:
communicating first packet-switched data between a mobile station and a first cell using a first value of a first identifier and a value of a local type of a second identifier, wherein the mobile station is identified using the first value of the first identifier, and further wherein resources allocated for packet-switched services for the mobile station are identified using the value of the local type of the second identifier;
detecting a need to allocate resources for the mobile station in a second cell;
determining a value of a handover type of the second identifier different from the value of the local type of the second identifier, wherein the resources allocated for the packet-switched services for the mobile station in the first cell are identified using the value of the handover type of the second identifier; and
communicating second packet-switched data between the mobile station and the first cell using the determined value of the handover type of the second identifier.

17. The method of claim 16, further comprising sending a second value of the first identifier to the mobile station.

18. The method of claim 17, further comprising receiving an acknowledgement message acknowledging receipt of the second value of the first identifier from the mobile station.

19. The method of claim 16, wherein the value of the handover type of the second identifier is determined based on the first value of the first identifier.

20. The method of claim 16, wherein the value of the local type of the second identifier is determined based on the first value of the first identifier.

21. The method of claim 16, wherein the need is detected based on a routing area update request from the mobile station.

22. The method of claim 16, wherein the need is detected based on a handover request from the mobile station.

23. The method of claim 16, wherein communicating the second packet-switched data comprises uplink transfer of the second packet-switched data.

24. The method of claim 16, wherein the first identifier is a temporary mobile subscriber identifier.

25. The method of claim 16, wherein the second identifier is a temporary logical link identifier.

26. A method for identifying resources in a cellular network, comprising:
receiving a resource allocation request for a mobile station from a first cell at a second cell, wherein the resource allocation request includes a value of a local type of a second identifier;
allocating resources for packet-switched services to the mobile station at the second cell;
determining a first value of a first identifier and a value of a handover type of the second identifier different from the value of the local type of the second identifier;
communicating first packet-switched data between the mobile station and the second cell using the value of the local type of the second identifier, wherein the allocated resources are identified using the value of the local type of the second identifier;
receiving an indication of completion of a handover process from the first cell to the second cell; and
after receiving the indication, communicating second packet-switched data between the mobile station and the second cell using the first value of the first identifier and the value of the handover type of the second identifier, wherein the mobile station is identified using the first value of the first identifier, and further wherein the allocated resources are identified using the value of the handover type of the second identifier.

27. The method of claim 26, wherein the resource allocation request further includes a second value of the first identifier.

28. The method of claim 27, wherein the value of the handover type of the second identifier is determined based on the second value of the first identifier.

29. The method of claim 26, wherein the value of the handover type of the second identifier is determined based on the first value of the first identifier.

30. The method of claim 26, wherein the indication is received after completion of a routing area update procedure.

31. The method of claim 26, wherein the indication is received after completion of a handover procedure.

32. The method of claim 26, wherein the first identifier is a temporary mobile subscriber identifier.

33. The method of claim 26, wherein the second identifier is a temporary logical link identifier.

* * * * *

UNITED STATES PATENT AND TRADEMARK OFFICE
CERTIFICATE OF CORRECTION

| | | |
|---|---|---|
| PATENT NO. | : 7,904,088 B2 | Page 1 of 1 |
| APPLICATION NO. | : 10/569458 | |
| DATED | : March 8, 2011 | |
| INVENTOR(S) | : Rexhepi et al. | |

It is certified that error appears in the above-identified patent and that said Letters Patent is hereby corrected as shown below:

Title page, item (56), under "Foreign Patent Documents", in Column 2, Line 1, delete "AL 03/001830 A1" and insert -- WO 03/001830 A1 --.

Signed and Sealed this
Nineteenth Day of July, 2011

David J. Kappos
*Director of the United States Patent and Trademark Office*